Feb. 15, 1927.
C. FRICK
REVOLUBLE METAL CUTTING STICK
Filed March 12, 1926
1,617,801
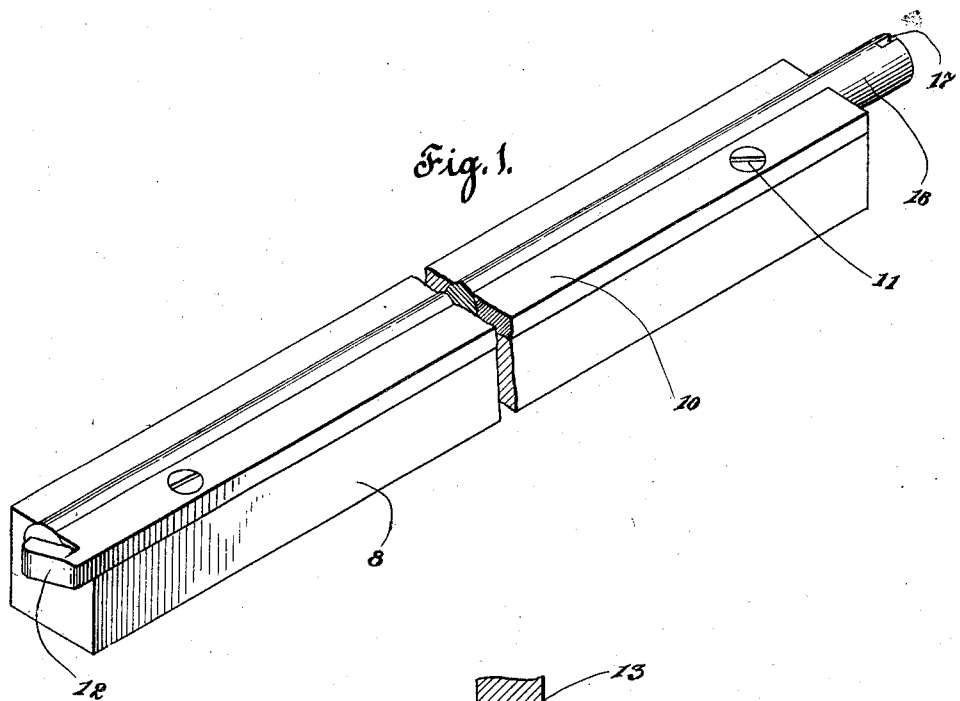
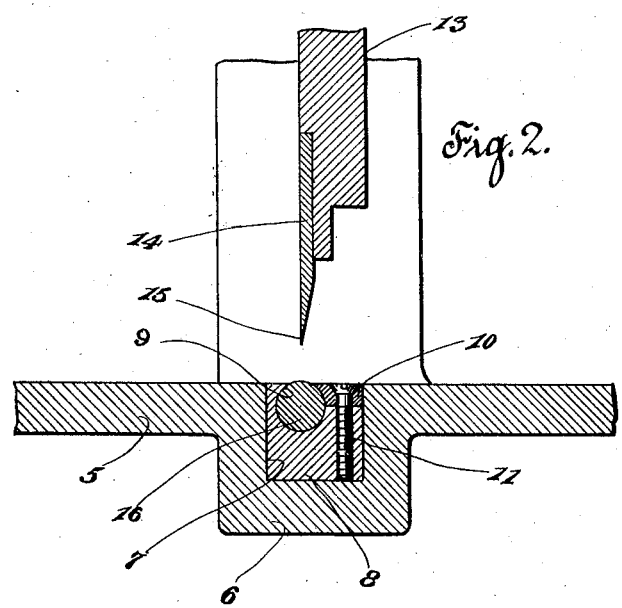
INVENTOR
Charles Frick
BY
Frak C. Fischer
ATTORNEY Patented Feb. 15, 1927.

1,617,801

UNITED STATES PATENT OFFICE.

CHARLES FRICK, OF IRVINGTON, NEW JERSEY.

REVOLUBLE METAL-CUTTING STICK.

Application filed March 12, 1926. Serial No. 94,160.

This invention relates to machines used in cutting thin, light, flexible material, as paper, and more particularly to cutting sticks co-acting with the knife, in the manner of a yielding anvil, to produce a clean cut.

One of the objects of the present invention is to provide a channelled bed in which to seat an elongated rectangular block, bored longitudinally to receive a cutting stick and provided with a clamping device to retain the stick as adjusted therein.

A further feature is to arrange the clamping elements so to be conveniently accessible from the upper surface, thus avoiding removal of the block when adjusting the cutting stick, means also being provided to prevent excessive insertion of the stick.

Another purpose is in the provision of a cylindrical metal stick of a nature adapted to receive the cutting edge of a knife without damaging or dulling it, and which, due to the pecularity of its embedment in the block, is automatically restored, nearly or quite, to its initial smooth surfaced condition by reason of the gashes becoming closed as it is rotated from one position to another.

These several important objects are accomplished by the simple and novel construction of parts hereinafter described and illustrated in the accompanying drawing, forming a material part of this disclosure, and in which:—

Figure 1 is a perspective view of a holder block with cutting stick as made in accordance with the invention.

Figure 2 is a transverse sectional view of the device as mounted for operation with reference to a cutter blade.

The bed 5, shown conventionally, has a central longitudinal boss 6 on its underside into which extends a channel 7 open at the top.

Fitted to the channel is a holder block 8, level with the upper surface of the bed 5, this block having a bore 9 throughout its entire length, to one side of its center and cuts through at the top as shown.

The upper portion of the block is cut away on the wide side, relative to the bore, the depth of the cut being substantially uniform with the axis of the bore and fitted on the block is a gib 10 held by clamp screws 11 having their heads level with the upper surface of the block, of which the gib is a complementary portion.

The rear or inner end of the gib 10 is extended past the block 8, its end being formed to act as a stop 12 reaching into the zone of the bore 9. Over the bed is mounted a plunger 13 carrying a knife 14 having a sharply bevelled keen cutting edge 15 positioned directly over the axis of the bore 9.

Neatly fitted to the bore 9 is a cylindrical stick or rod 16 of metal of a semi-yielding nature, sufficiently hard to retain its shape under the wear to which it is subjected but not of a character to damage or materially dull the blade of the knife 15 when brought into operative contact with it, as in severing a paper sheet, the material preferably used for the stick being an alloy in which aluminum predominates.

The outer extending end of the stick may be provided with a knob or formed with a slot 17 to facilitate turning the stick partially around to present a smooth surface to the knife.

It is to be noted that the stick has but a small portion of its surface exposed, the greater part being embedded in the block, the edges of which act in the manner of a shear in removing any raised ledges, caused by the knife.

It has been found that, due to the almost entire embedment of the stick, the minute creases, caused by contact with the knife are almost completely closed, in a manner ironed out, becoming filled by reason of the hammer-like action of the knife, intensified by the frictional effect of rotation imparted in adjusting to new positions, thus in effect prolonging the use of the stick far beyond the usual.

While a certain embodiment of this device has been shown and described, it will be understood that changes in the form, arrangements, proportions, sizes and details thereof may be made without departing from the scope of the invention as defined in the appended claims.

Having thus described my invention, what I claim as new and desire to secure by Letters Patent, is:—

1. In a cutting machine having a bed containing a longitudinal channel of rectangular cross section, a holder block fitted to the channel, said block having a cylindrical bore a portion of its periphery being open, a cylindrical stick revoluble in the bore, said stick being composed of an alloy in which aluminum predominates, a gib on said block to impinge on said stick, means for clamping said gib from the top of the block, and a stop formed on said gib limiting the insertion of said stick.

2. In a cutting machine having a bed containing a longitudinal channel of rectangular cross section, a holder block fitted to the channel, said block having a cylindrical bore a portion of its periphery being open, a cylindrical stick revoluble in the bore, said stick being composed of an alloy in which aluminum predominates, a gib on said block to impinge on said stick, means for clamping said gib while in the channel, a stop on said gib at the end of the channel, and means to facilitate revolving said stick.

This specification signed and witnessed this 11th day of March, 1926.

CHARLES FRICK.